No. 846,695. PATENTED MAR. 12, 1907.
W. H. REED.
BICYCLE PACKAGE CARRIER.
APPLICATION FILED APR. 30, 1906.
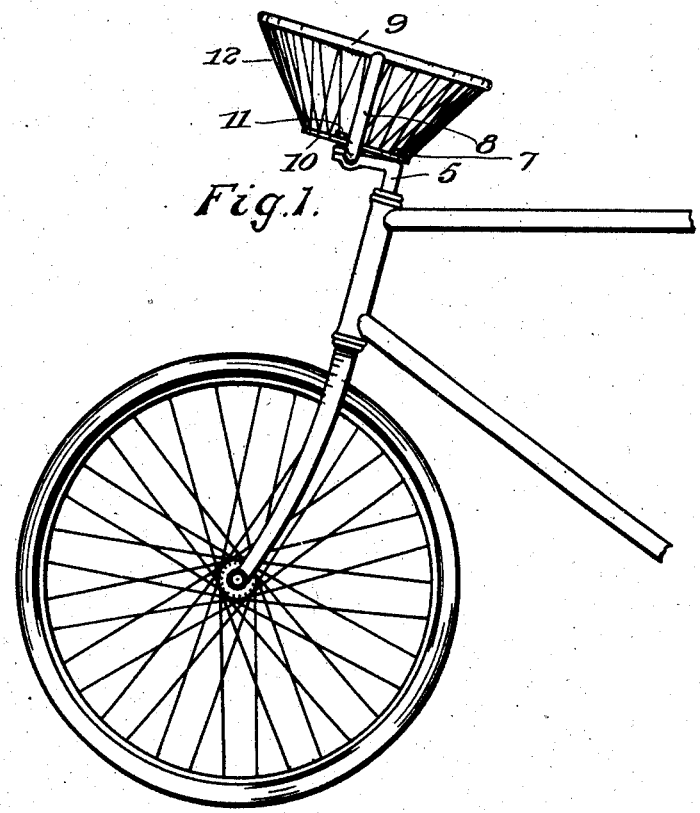
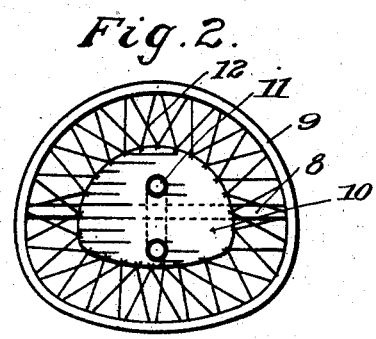
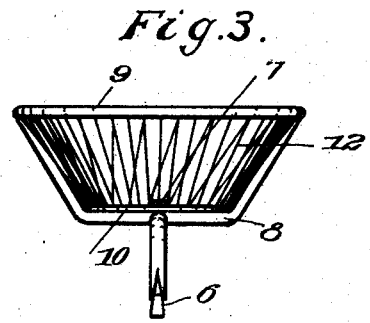
Witnesses
Inventor
William H. Reed
By Hazard T. Marsham
Attorneys

UNITED STATES PATENT OFFICE.

WILLIAM H. REED, OF SAWTELLE, CALIFORNIA.

BICYCLE PACKAGE-CARRIER.

No. 846,695.      Specification of Letters Patent.      Patented March 12, 1907.

Application filed April 30, 1906. Serial No. 314,517.

*To all whom it may concern:*

Be it known that I, WILLIAM H. REED, a citizen of the United States, residing at Sawtelle, in the county of Los Angeles and State of California, have invented new and useful Improvements in Bicycle Package-Carriers, of which the following is a specification.

My invention relates to a combined handle-bar and package-carrier; and the object thereof is to provide a package-carrier which will at the same time operate as a handle-bar.

I accomplish this object by the device described herein and illustrated in the accompanying drawings, in which—

Figure 1 is a side elevation of my improved handle-bar and package-carrier in place on the bicycle, of which the front portion only is shown. Fig. 2 is a plan of the handle-bar and package-carrier detached from the bicycle. Fig. 3 is a side elevation of the handle-bar and package-carrier detached from the bicycle.

In the drawings, 5 is an L-shaped stem which takes the place of the ordinary handle-bar stem and is secured to the front fork in the usual well-known manner used to secure handle-bar stems. This stem is shown in the drawings as being secured by means of the expander 6, which is operated by a stem having a head 7 for the reception of a wrench, by means of which the expander is operated. The front end of stem 5 is bifurcated and receives in the furcations side rod 8, which is preferably horizontal for a distance on each side of the stem and then turns upwardly on an outward slant and is connected to bar 9, which forms the top rim of the package-carrier and serves as a means to guide the wheel in lieu of the ordinary handle-bar. A plate 10 is secured upon the top of the stem by means of bolt 11, which passes through the plate and in threaded contact through the arms of the forward part of the stem 5 and not only secures the plate thereto, but also secures rod 8 therein, and at the same time provides means for detaching the package-carrier and substituting therefor ordinary handle-bars. The expander-stem also passes through plate 10. From bar 9 to plate 10 and secured to each are wires 12, which complete the package-carrier. By this construction a neat and convenient package-carrier is provided at but little cost over the ordinary handle-bar by means of which the wheel can be guided with the same facility that it can be guided by the ordinary handle-bar.

Having described my invention, what I claim is—

1. A package-carrier for bicycles comprising a basket-shaped receptacle provided with a substantial top rim; a rod passing from one side of the rim to the other side thereof in a direction to conform to the sides of the basket; and a stem secured to the center of said rod, said stem being adapted to be secured to the front fork of the bicycle.

2. A package-carrier for a bicycle comprising a nearly circular top rim; a side rod secured to the top rim, said side rod being of a shape to conform to the sides of the carrier; a stem secured to the bottom of said side rod, said stem being adapted to be secured to the front fork of the bicycle; a bottom plate secured upon said stem; and interlaced wires secured to said bottom plate and said top rim.

In witness that I claim the foregoing I have hereunto subscribed my name this 25th day of April, 1906.

WILLIAM H. REED.

Witnesses:
    G. E. HARPHAM,
    EDMUND A. STRAUSE.